United States Patent
Schukal

(10) Patent No.: US 6,588,802 B2
(45) Date of Patent: Jul. 8, 2003

(54) TWO-PART, CLAMP-CONNECTED CHIMNEY FLUE TEE

(76) Inventor: Fred G. Schukal, 85 Emjay Blvd., Brentwood, NY (US) 11717

( * ) Notice: Subject to any disclaimer, the term of this patent is extended or adjusted under 35 U.S.C. 154(b) by 0 days.

(21) Appl. No.: 09/887,943

(22) Filed: Jun. 22, 2001

(65) Prior Publication Data

US 2002/0195818 A1 Dec. 26, 2002

(51) Int. Cl.[7] .............................................. F16L 39/00
(52) U.S. Cl. .................... 285/133.11; 424/47; 285/311; 285/424; 285/179.2; 285/183
(58) Field of Search ........................ 285/133.11, 133.3, 285/133.6, 308, 309, 311, 424, 183, 179.2, 320, 184, 23, 326, 129.1; 454/47, 44

(56) References Cited

U.S. PATENT DOCUMENTS

| | | | | |
|---|---|---|---|---|
| 2,482,558 | A | * 9/1949 | Scaringella | 138/166 |
| 2,701,148 | A | * 2/1955 | Lanninger | 285/146.3 |
| 3,151,895 | A | * 10/1964 | Ward | 24/270 |
| 3,345,092 | A | * 10/1967 | Athma et al. | 180/89.2 |
| 3,479,701 | A | * 11/1969 | Zerfoss | 24/270 |
| 4,490,876 | A | * 1/1985 | Haberl | 126/16 |
| 4,874,191 | A | 10/1989 | Green | |
| 4,900,064 | A | * 2/1990 | Lyons et al. | 285/140.1 |

OTHER PUBLICATIONS

T.C.E.; New Base Tee, Tab it or Screw it; Advertising Leaflet; Date: unknown; Publisher: unknown.

Trans Continental Equipment LTD T.C.E. Quadralock Chimney Flex; Internet Web Page Advertisement, Four Pages at: www.tce.ca/newz. html, accessed Aug. 20, 2001.
Sleepy Hollow Chimney Supply; Super Rigid Chimney Liner; Installation and Maintencance Instuctions, Date: Apr. 16, 2001, pages 8 and 9; Sleepy Hollow Chimney Supply, 85 Emjay Boulevard, Brentwood, N.Y. U.S.A.

* cited by examiner

Primary Examiner—Lynne H. Browne
Assistant Examiner—Aaron M Dunwoody
(74) Attorney, Agent, or Firm—R. Michael West

(57) ABSTRACT

A two-part clamp-connected chimney flue tee. The tee includes an elongated main section which is detachably connected to a transversely extending bull, or snout section. The main section has flue pipe connection ends and an oval cut-out portion in its sidewall, generally midway between the connection ends. The periphery of the cut-out includes an outwardly flaring flange, for mating with a corresponding contoured end of the bull section. Hooks are mounted on the inner sidewall of the main section, on opposing sides of the cut-out. Lever-actuated clamps, having a U-shaped locking member, are mounted on opposing inner portions of the sidewalls of the contoured end of the bull section. In mating the two sections, the bull section is press-fitted over the flange surrounding the cut-out. A locking member on one side of the contoured end is engaged with a respective hook. Then, the lever on the clamp is snapped toward the adjacent sidewall, into a locked position. The process is repeated for the locking member, the hook, and the lever on the other side of the conjunction, to secure the two sections firmly together.

20 Claims, 2 Drawing Sheets

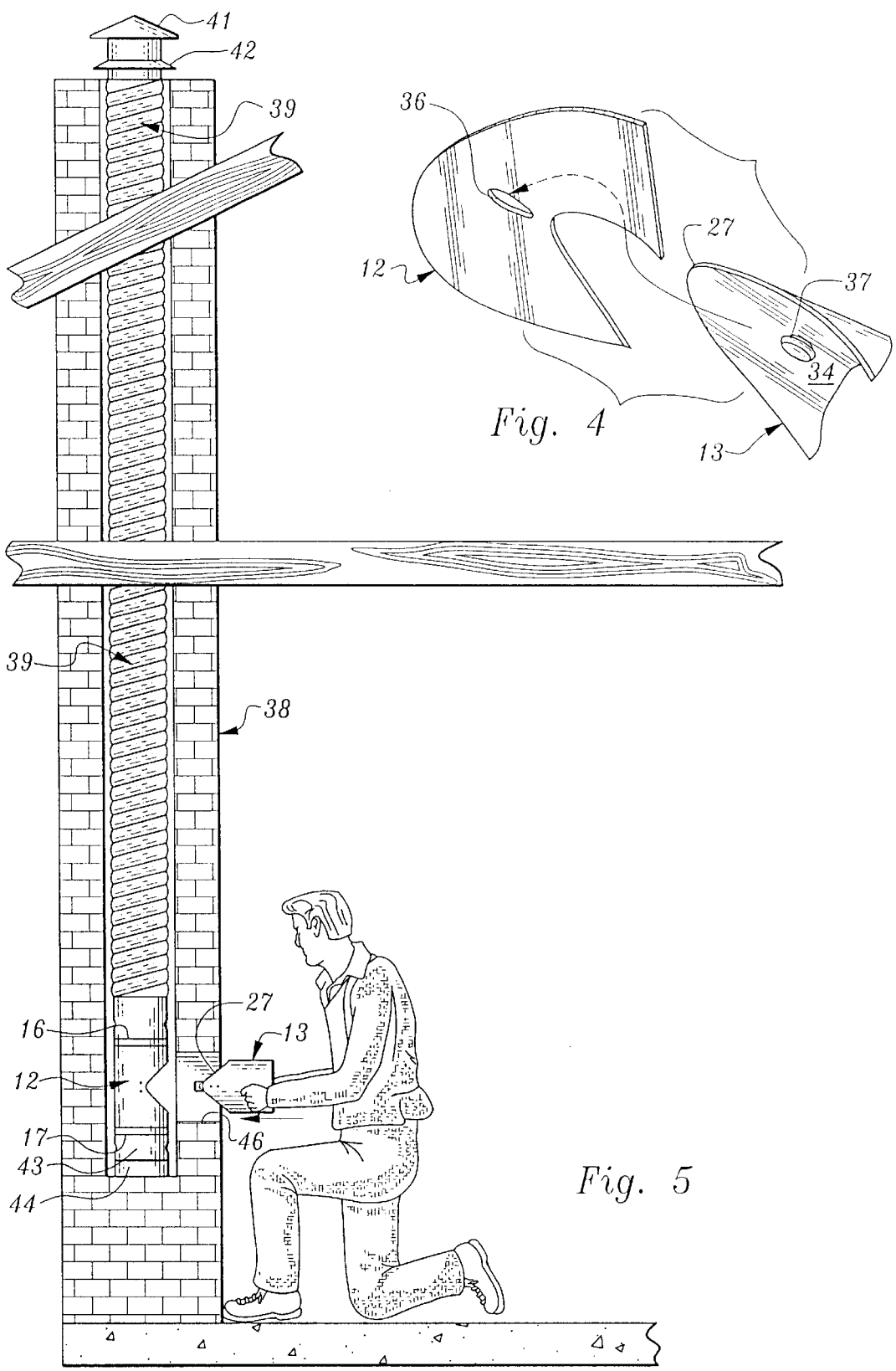

TWO-PART, CLAMP-CONNECTED CHIMNEY FLUE TEE

BACKGROUND OF THE INVENTION

1. Field of the Invention

The invention relates generally to flue pipe accessories, for interconnecting a flue pipe with a heating appliance. More specifically, the invention pertains to two-part chimney flue tees, typically employed when relining either unlined or tile-lined masonry chimneys, which vent stoves, fireplaces, fireplace inserts, or heating appliances fueled by oil, coal, or gas.

2. Description of the Prior Art

For purposes of safety and improved heating performance, it is desirable to modernize old chimneys by relining them with a stainless steel chimney liner. Old chimneys are sometimes over-sized for the fire-box of the fireplace or heating appliance, so that an excessive amount of draft is produced. This results in an unnecessary loss of heat and a faster rate of fuel consumption. A certain number of old chimneys are unlined, as well. Unlined chimneys may have air leaks, and they do not provide the safety and efficiency that a lined chimney does. Even if a masonry chimney is tile-lined, an insulated stainless steel chimney liner provides upgraded safety and performance.

The difficulty lies in the proper installation of such chimney liners, given the fact that access to the interior volume of the old chimney is limited. This makes assembly of tubular sections of the liner, and the associated fittings and accessories, a challenge. Although techniques and processes have been developed for installing chimney liners, there are particular stages of assembly which remain time-consuming.

One such stage is the interconnection of the chimney flue line with the particular stove, fireplace, fireplace insert, or heating appliance being installed. Typically, a chimney flue tee is used, to redirect the horizontal output vent from the heating appliance 90 degrees, so it may be connected to the vertically oriented chimney flue line. The chimney flue liner is sequentially assembled immediately above the upper end of the chimney, where it is carefully fed downwardly until it reaches the area where the flue tee is to be located. Owing to limited lateral clearance, it is impossible to feed a fully assembled flue tee down the chimney, on the lowermost end of the flue liner. Therefore, two-part flue tees have been developed, so the elongated main section of the tee can be connected to the end of the flue liner and freely lowered into place. Then, a separate part, known in the trade as a tee bull or "snout", is pushed through an access hole in the side of the chimney to join the elongated section of the tee.

Several systems have been used to interconnect the tee bull with the main tee section. Probably the most common connection system is a screwdriver-adjustable band arrangement. This band arrangement is manufactured from stainless steel, and resembles a large hose clamp in construction. The band is connected to one side of the tee bull, extends around the back side of the main tee section, and then returns back to a length-adjustable connection on the other side of the tee bull. To install such a band, the screw adjustment is loosened a sufficient amount, so that the main tee section can be lowered within the loop formed by the band. Once the tee bull is aligned with the hole in the sidewall of the main tee section, and furnace cement is applied to the joint, a screwdriver is used to tighten the band and draw the two parts together.

Yet another prior art construction uses two pairs of threaded brackets. Two brackets, each with a threaded hole, extend from the inner sidewall of the main tee section, adjacent the hole in the sidewall. The complementary brackets, each rotatably supporting a long screw, are mounted to the inner sidewall of the tee bull section. When the tee bull is held in alignment with the hole in the main tee section, the installer aligns the screws with the threaded holes in the interior brackets, and screw tightens the two parts together.

Both of the above-described tee connection systems are difficult to use, and require tedious alignment of components and fasteners in dark and restricted areas. The connection components do not always align properly, particularly on the first try, and as a consequence, valuable labor is often wasted in assembling the flue tee.

Consequently, the need exists for a two-part chimney flue tee which which is simple to use and fast to connect, both for installation, and for system repair or modification.

The need further exists for a two-part chimney flue tee which may be site assembled without tools, eliminating the necessity of aligning the tool with an adjustable fastener.

The need also exists for a connection system for a two-part chimney flue tee which is self-aligning and positive in locking action.

The need further exists for a connection system for a two-part chimney flue tee which can withstand the corrosive elements and elevated temperatures encountered in a chimney flue.

These and other objects of the two-part chimney flue tee of the present will be discussed in the detailed description to follow.

SUMMARY OF THE INVENTION

The first part of the present chimney flue tee is a main section. The main section is elongated and tubular, terminating with flue pipe connection ends and including a cut-out portion in its sidewall. The cut-out portion is located generally mid-way, between the two connection ends. The cut-out portion includes a peripheral edge, provided with an outwardly flaring flange.

The main section also has an inner sidewall. Inwardly protruding hooks are mounted on the inner sidewall, on opposing sides of the cut-out portion.

The second part of the tee is a termed a bull, or snout section. The bull section is also tubular, and includes a contoured end, of appropriate size and configuration to fit snugly over the flange of the cut-out portion. The bull section has a pair of lever-actuated clamps mounted on inner opposing portions of the sidewall of the contoured end. Each clamp has a U-shaped locking member, a lever, and a mounting bracket. The open end of the U-shaped locking member is pivotally attached to the lever. The lever, in turn, is pivotally mounted to the mounting bracket. The closed end of the U-shaped locking member is sized to engage a respective hook inside the mouth of the cut-out portion.

When the contoured end of the bull section is slipped over the flange, the bull section is transversely positioned with respect to the main section, thus forming the tee assembly. The first locking member is placed over an adjacent hook and the lever is snapped shut, toward the inner sidewall of the bull section. The same operation is performed with the second locking member. The lever action of the clamps draws the main section and the bull section together, in perfect alignment.

Second and third embodiments of the chimney flue tee are also disclosed. In the second embodiment, the relative positions of the hooks and the lever-actuated clamps are simply reversed. In other words, the hooks are mounted on the inner opposing portions of the sidewall of the bull section, and the lever-actuated clamps are mounted on opposing sides of the cut-out portion, on the inner sidewall of the main section. In all respects of assembly and performance, the second embodiment is equivalent to that of the first embodiment.

In the third embodiment, one of the hook and lever-actuated clamp sets is replaced with a first and second connection fixture. The first connection fixture is disclosed as an aperture, extending through the sidewall of the main section. The second connection fixture is shown as a boss, extending inwardly from the contoured end of the bull section. When the contoured end is slipped over the flange, the boss passes through and engages the aperture, locking one side of the contoured end to one side of the cut-out portion. Then, when the locking member of the lever-actuated clamp is placed over an adjacent hook and the lever is snapped shut, the main section and the bull section are securely joined.

BRIEF DESCRIPTION OF THE DRAWINGS

FIG. 4 is view as in FIG. 2, but showing the third embodiment of the present invention, employing first and second connection fixtures in lieu of one of the hook and lever-actuated clamp sets; and, FIG. 5 is a side elevational view of a typical installation of the chimney flue tee of the present invention, showing the tee bull section being inserted through an access hole in the chimney flue sidewall, for connection with the tee's main section.

DETAILED DESCRIPTION OF THE PREFERRED EMBODIMENT

Figure 1:
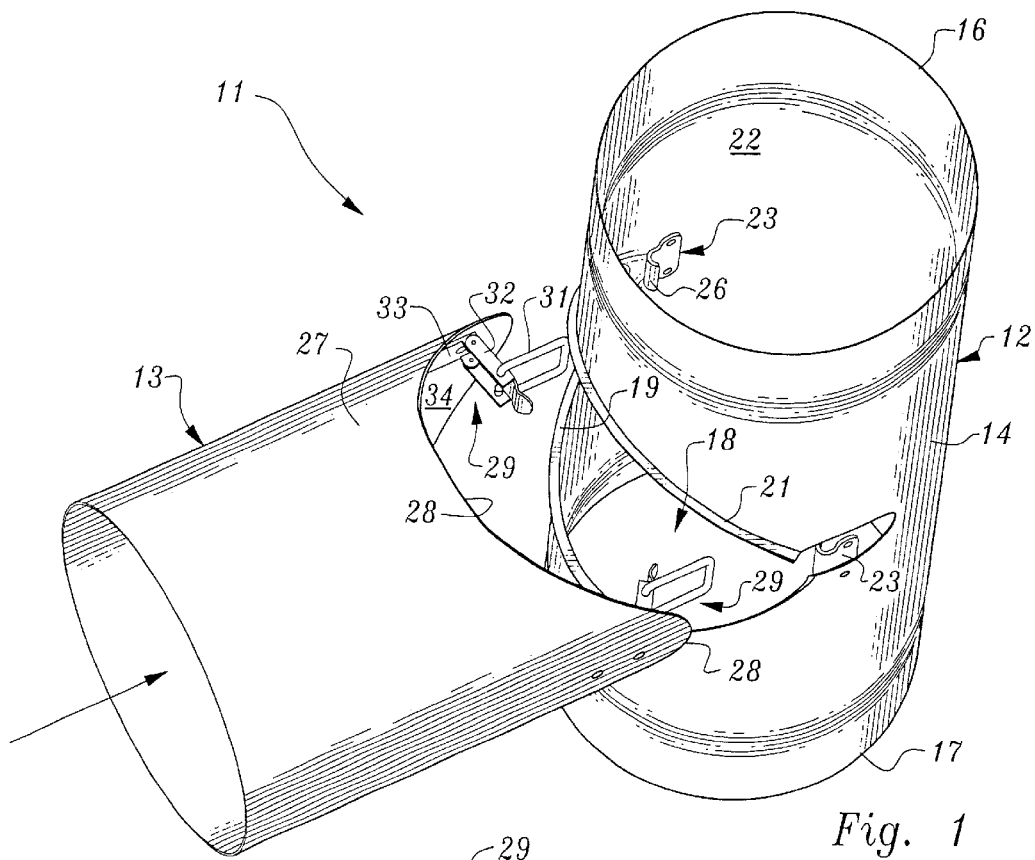
FIG. 1 is an exploded, perspective view of the two-part, clamp-connected chimney flue tee of the present invention, a portion of the sidewall of the main section being broken away to show a hook on one side of the cut-out.

Turning now to FIG. 1, the chimney flue tee 11 of the present invention includes two parts, a main section 12 and a bull or snout section 13. Preferably, sections 12 and 13 are manufactured from stainless steel, to resist rust and to withstand the corrosive effects of combustion exhaust. The main section 12 is elongated and tubular, having a sidewall 14 terminating with upper and lower flue pipe connection ends, respectively designated 16 and 17. Main section 12 further includes a cut-out portion 18 in the sidewall 14. The cut-out portion 18 is generally located mid-way between the connection ends 16 and 17, but could be offset in either direction along sidewall 14, for special tee applications. Cut-out portion 18 includes a periphery 19, from which an outwardly flaring flange 21 extends. In the version of the tee 11 shown in FIG. 1, the periphery 19 appears oval in elevation, owing to the transverse intersection between main section 12 and bull section 13. Of course, if either tee section were other than right-circular in configuration, the shape of periphery 19 would change accordingly.

The sidewall 14 of main section 12 includes an inner sidewall 22. A pair of hooks 23 is mounted on inner sidewall 22, on opposing sides of the cut-out portion 18. As will be noted from the drawings, each of the hooks 23 include a base 24 and an elongated arcuate portion 26. Base 24 may be either spot welded or pop rivet connected to inner sidewall 22.

Like main section 12, bull section 13 is also tubular, and includes a sidewall 27. The sidewall 27 has a contoured end 28, which is sized and configured to encompass cut-out portion 18. Preferably, contoured end 28 also provides a snug press fit over flange 21, to assist in aligning the sections during assembly and to provide a superior seal after assembly.

Bull section 13 includes a pair of lever-actuated clamps 29. Each clamp 29 has a U-shaped locking member 31, a lever 32, and a mounting bracket 33. The "open" end of locking member 31 is pivotally attached to lever 32. The "closed" end of the U-shaped locking member 31 is sized and configured to fit within arcuate portion 26. Lever 32 is pivotally attached to mounting bracket 33. The mounting brackets 33 of clamps 29 are pop riveted or spot welded on inner opposing portions 34 of the sidewall 27, on the projections of contoured end 28.

Figure 2:
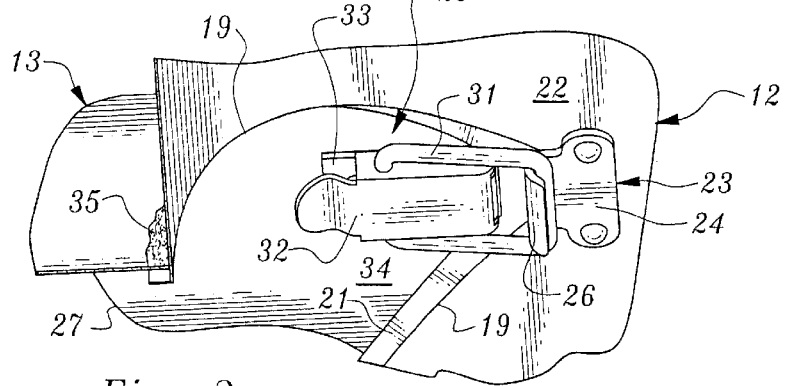
FIG. 2 is a fragmentary view of the juncture of the cut-out portion of main section and the contoured end of the bull section, showing the lever-actuated clamp and the hook in a locked position.
Figure 3:
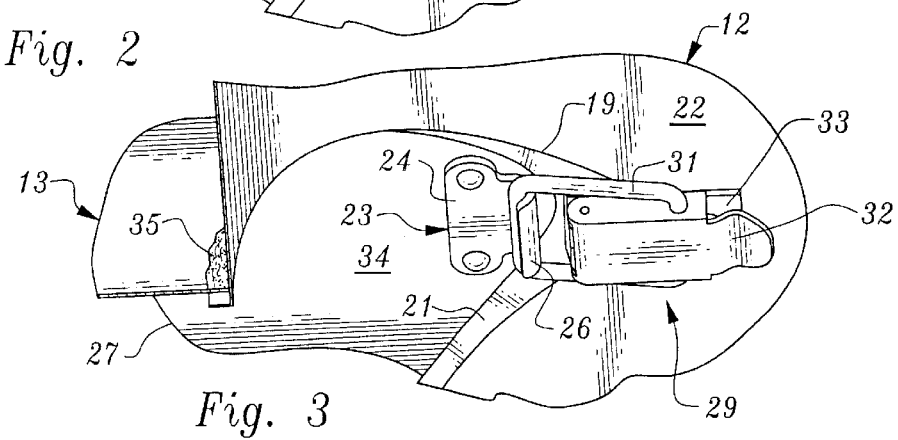
FIG. 3 is a view as in FIG. 2, but showing the second embodiment of the present invention, where the relative mounting positions of the hook and the lever-actuated clamp are reversed.

In preparation for assembly of the chimney flue tee 11, a line of furnace cement 35 or other temperature resistant sealant, is preferably applied onto the flange 21, extending entirely around the periphery 19. Next, bull section 13 is transversely positioned with respect to the longitudinal axis of the main section 12. The contoured end 28 is then pressed over flange 21. The line of furnace cement thereby forms a seal between the contoured end and the periphery. The installer reaches in through bull section 13, and places the U-shaped locking member 31 of a first clamp 29, into the arcuate portion 26 of a respective hook 23. The lever 32 is then urged toward an adjacent inner portion 34 of the sidewall 27, into a locked position. See, FIG. 2. This operation is then repeated for the second clamp 29, mounted on the opposing inner portion 34. The lever-actuated clamps 29 pull the bull section 13 into snug relation with main section 12, and the furnace cement 35 between adjacent and contingent portions of the sections ensures a thorough seal. A second embodiment of the chimney flue tee 11 is identical to that just described, with the exception that the positions of hooks 23 and the clamps 29, are reversed. As shown in FIG. 3, the hook 23 is mounted on inner portion 34 of the sidewall 27 of contoured end 28. And, the clamp 29 is mounted on the inner sidewall 22 on one side of the cut-out 18. This hook and clamp combination is repeated on the opposing inner portion of the sidewall 27, and on the inner sidewall 22 on the opposing side of the cutout 18. The second embodiment of the chimney flue tee is assembled using an identical process to that used for the first embodiment, except that the levers 32 on each of the clamps are urged toward an adjacent inner sidewall 22 of the main section 12, to secure the clamps in a locked position.

A third embodiment of the chimney flue tee is shown in FIG. 4. In this embodiment, one of the hook and lever-actuated clamp sets previously described, is replaced with a first connection fixture 36 and a second connection fixture 37. For purposes of illustration, the first connection fixture 36 is an aperture in the sidewall 14 of the main section 12, and the second connection fixture 37 is a boss inwardly protruding from the inner portion 34 of the sidewall 27 of contoured end 28. It should be understood that a hook 23 and the first connection fixture 36 are located on opposing sides of the cut-out 18, and that a clamp 29 and the second connection fixture 37 are mounted on opposing inner portions of the sidewall 27 of the contoured end 28. In assembly of the third embodiment of the flue fee 11, the first and second connection fixtures are interconnected in a first step. Then, the locking member 31 of the clamp 29 is engaged with the hook 23, and the lever on the clamp is urged toward the inner portion of the contoured end, into a locked position. Of course, both the first and second connection fixtures, and the hook and clamp may be reversed, as taught by the reversal of clamping components in the second embodiment.

A simplified depiction of an actual installation of the chimney flue tee 11 is shown in FIG. 5. A chimney 38 has been retrofitted with a stainless steel chimney liner 39. The upper end of the liner is fitted with a cap 41 and a storm collar 42. The main section 12 of the chimney flue tee of the present invention was attached to the lower end of the liner 39, before it was lowered into the flue of the chimney. A tee cap 43 is attached to the lower connection end 17 of the main section 12. The tee cap 43 rests upon a pile of sand or bricks 44. An access hole 46 has previously been cut in the sidewall of the chimney 38, by the installer. The bull section 13 is slipped through the access hole 46, so that its contoured end 28 fits in snug relation over the flange 21, extending around the cut-out portion of the main section 12. Then, the locking members are placed over a respective hook and the levers are urged into a locked position. The installer may then add necessary flue pipe to the free end of the bull section and connect that pipe to the appliance or stove.

What is claimed is:

1. A two-part, clamp-connected chimney flue tee, comprising:
    a. an elongated, tubular main section having a sidewall terminating with flue pipe connection ends, said main section further including a cut-out portion in said sidewall, said cut-out portion being located between said connection ends and including a periphery, said main section further including an inner sidewall and hooks located on said inner sidewall, on opposing sides of said cut-out; and,
    b. a tubular bull section extending transversely from said main section, said bull section including a contoured end having a sidewall, said contoured end being sized and configured to fit over said cut-out portion of said main section, said bull section further including at least a pair of lever-actuated clamps having a U-shaped locking member, said clamps being located on opposing respective inner portions of said sidewall of said contoured end, whereby said locking members are engaged with a respective hook, and a lever on each said clamp is urged toward a respective said inner portion of said sidewall of said contoured end, into a locked position.

2. The flue tee of claim 1, in which said main section and said bull section are manufactured from stainless steel.

3. The flue tee of claim 1, in which said hooks and said clamps are secured, respectively, to said main section and to said bull section, using pop rivets or spot welds.

4. The flue tee of claim 1, in which said periphery is oval in configuration.

5. The flue tee of claim 1, in which said U-shaped locking member is pivotally mounted to said lever, and said lever is pivotally mounted to a bracket.

6. The flue tee of claim 1, further including a line of furnace cement extending between said contoured end and said periphery, forming a seal therebetween.

7. A two-part, clamp-connected chimney flue tee, comprising:
    a. an elongated, tubular main section having a sidewall terminating with flue pipe connection ends, said main section further including a cut-out portion in said sidewall, said cut-out portion being located between said connection ends and including a periphery, said main section further including an inner sidewall and at least a pair of lever-actuated clamps each having a U-shaped locking member, said clamps being located on said inner sidewall, on opposing sides of said cut-out; and,
    b. a tubular bull section extending transversely from said main section, said bull section including a contoured end having a sidewall, said contoured end being sized and configured to fit over said cut out portion of said main section, said bull section further including hooks located on opposing respective inner portions of said sidewall of said contoured end, whereby said locking members are engaged with a respective hook, and a lever on each of said clamps is urged toward a respective said inner sidewall of said main section, into a locked position.

8. The flue tee of claim 7, in which said main section and said bull section are manufactured from stainless steel.

9. The flue tee of claim 7, in which said hooks and said clamps are secured, respectively, to said main section and said bull section, using pop rivets or spot welds.

10. The flue tee of claim 7, in which said periphery is oval in configuration.

11. The flue tee of claim 7, in which said U-shaped locking member is pivotally mounted to said lever, and said lever is pivotally mounted to a bracket.

12. The flue tee of claim 7, further including a line of furnace cement extending between said contoured end and said periphery, forming a seal therebetween.

13. A two-part, clamp-connected chimney flue tee, comprising:
    a. an elongated, tubular main section having a sidewall terminating with flue pipe connection ends, said main section further including a cut-out portion in said sidewall, said cut-out portion being located between said connection ends and including a periphery, said main section further including an inner sidewall with a hook and a first connection fixture on said inner sidewall, said hook and said first connection fixture being located on opposing sides of said cut-out; and,
    b. a tubular bull section extending transversely from said main section, said bull section including a contoured end being sized and configured to fit over said flange of said cut out portion of said main section, said bull section further including a lever-actuated clamp having a U-shaped locking member, said clamp being located on an inner portion of a sidewall of said contoured end of the bull section, said bull section further including a second connection fixture, said second connection fixture being located on an opposing inner portion of said sidewall of said contoured end, whereby said first and second connection fixtures are interconnected and said locking member is engaged with said hook, and a lever on said clamp is urged toward said inner portion of said sidewall of said contoured end, into a locked position.

14. The flue tee of claim 13, in which said main section and said bull section are manufactured from stainless steel.

15. The flue tee of claim 13, in which said hooks and said clamps are secured, respectively, to said main section and said bull section, using pop rivets or spot welds.

16. The flue tee of claim 13, in which said periphery is oval in configuration.

17. The flue tee of claim 13, in which said U-shaped locking member is pivotally mounted to said lever, and said lever is pivotally mounted to a bracket.

18. A two-part, clamp-connected chimney flue tee, comprising:
   a. an elongated, tubular main section having a sidewall terminating with flue pipe connection ends, said main section further including a cut-out portion in said sidewall, said cut-out portion being located between said connection ends and including a periphery having an outwardly flaring flange, said main section further including an inner sidewall and hooks mounted on said inner sidewall, on opposing sides of said cut-out; and,
   b. a tubular bull section extending transversely from said main section, said bull section including a contoured end having a sidewall, said contoured end being sized and configured to fit over said flange of said cut-out portion of said main section, said bull section further including at least a pair of lever-actuated clamps having a U-shaped locking member, said clamps being mounted on inner opposing portions of said sidewall of said contoured end, whereby said locking members are engaged with a respective hook, and a lever on each said clamp is urged toward an adjacent inner portion of sidewall of said contoured end, into a locked position.

19. A two-part, clamp-connected chimney flue tee, comprising:
   a. an elongated, tubular main section having a sidewall terminating with flue pipe connection ends, said main section further including a cut-out portion in said sidewall, said cut-out portion being located between said connection ends and including a periphery having an outwardly flaring flange, said main section further including an inner sidewall and at least a pair of lever-actuated clamps each having a U-shaped locking member, said clamps being mounted on said inner sidewall, on opposing sides of said cut-out; and,
   b. a tubular bull section extending transversely from said main section, said bull section including a contoured end having a sidewall, said contoured end being sized and configured to fit over said flange of said cut out portion of said main section, said bull section further including hooks mounted on inner opposing portions of said sidewall of said contoured end, whereby said locking members are engaged with a respective hook, and a lever on each of said clamps is urged toward an adjacent inner sidewall of said main section, into a locked position.

20. A two-part, clamp-connected chimney flue tee, comprising:
   a. an elongated, tubular main section having a sidewall terminating with flue pipe connection ends, said main section further including a cut-out portion in said sidewall, said cut-out portion being located between said connection ends and including a periphery, said main section further including an inner sidewall with a hook and a first connection fixture on said inner sidewall, said hook and said first connection fixture being located on opposing sides of said cut-out, said first connection fixture being an aperture in said sidewall of said main section; and,
   b. a tubular bull section extending transversely from said main section, said bull section including a contoured end being sized and configured to fit over said flange of said cut out portion of said main section, said bull section further including a lever-actuated clamp having a U-shaped locking member, said clamp being mounted on an inner portion of a sidewall of said contoured end of the bull section, said bull section further including a second connection fixture, said second connection fixture being mounted on an opposing inner portion of said sidewall of said contoured end, said second connection fixture being a boss inwardly protruding from said opposing inner portion of said sidewall of said contoured end, whereby said aperture and said boss are interconnected and said locking member is engaged with said hook, and a lever on said clamp is urged toward said inner portion of said sidewall of said contoured end, into a locked position.

* * * * *